United States Patent [19]

Errico et al.

[11] Patent Number: 5,796,924
[45] Date of Patent: Aug. 18, 1998

[54] METHOD AND SYSTEM FOR SELECTING PATTERN RECOGNITION TRAINING VECTORS

[75] Inventors: James H. Errico, Palatine; Theodore Mazurkiewicz, Lake Zurich, both of Ill.

[73] Assignee: Motorola, Inc., Schaumburg, Ill.

[21] Appl. No.: 618,223

[22] Filed: Mar. 19, 1996

[51] Int. Cl.$^6$ .............................. G06F 1/00; G06F 15/18
[52] U.S. Cl. ................................. 395/23; 395/21
[58] Field of Search ................................. 382/155, 161; 395/20–25, 27

[56] References Cited

U.S. PATENT DOCUMENTS

| | | | |
|---|---|---|---|
| 4,149,081 | 4/1979 | Seppi | 250/445 |
| 4,624,008 | 11/1986 | Vensko | 81/43 |
| 4,654,873 | 3/1987 | Fujisawa et al. | 382/9 |
| 4,718,093 | 1/1988 | Brown | 381/43 |
| 4,718,103 | 1/1988 | Shojima et al. | 382/13 |
| 4,761,815 | 8/1988 | Hitchcock | 381/43 |
| 4,852,172 | 7/1989 | Taguchi | 381/43 |
| 4,912,649 | 3/1990 | Wood | 364/513 |
| 5,105,468 | 4/1992 | Guyon et al. | 382/14 |
| 5,115,479 | 5/1992 | Murayama | 382/56 |
| 5,161,204 | 11/1992 | Hutcheson et al. | 382/16 |
| 5,239,594 | 8/1993 | Yoda | 382/15 |
| 5,263,107 | 11/1993 | Ueda et al. | 382/157 |
| 5,263,124 | 11/1993 | Weaver et al. | 382/159 |
| 5,276,771 | 1/1994 | Manukian et al. | 395/24 |
| 5,299,284 | 3/1994 | Roy | 395/22 |
| 5,323,470 | 6/1994 | Kara et al. | 382/1 |
| 5,333,239 | 7/1994 | Watanabe et al. | 395/23 |
| 5,365,592 | 11/1994 | Horner et al. | 381/46 |
| 5,369,726 | 11/1994 | Kroeker et al. | 395/2.45 |
| 5,404,422 | 4/1995 | Sakamoto et al. | 395/2.41 |
| 5,479,523 | 12/1995 | Gaborski et al. | 382/159 |

OTHER PUBLICATIONS

Pattern Recognition Engineering, Morton Nadler, Chief Scientist, Image Processing Technologies, Eric P. Smith, Professor of Statistics, Virginia Polytechnic Institute and State University, Copyright 1993, pp. 294–319, 372–377.

Pattern Recognition: Statistical, Structural and Neural Approaches, Robert J. Schalkoff, Clemson University, Copyright 1992, pp. 340–342.

Fundamentals of Speech Recognition, Lawrence Rabiner, Biing–Hwang Juang, Copyright 1993 by AT&T, pp. 122–132.

A Polynomial Time Algorithm for Generating Neural Networks for Classification Problems, Asim Roy and Somnath Mukhopadhyay, Dept. of Decision and Information Systems, Arizona State University, Tempe, AZ 85287, Copyright 1992, IEEE, pp. I–147–I–152.

Modeling Systems with Polynomial Networks, Tools for predicting behavior, Peter D. Varhol, Dr Dobb's Journal, Sep. 1993, Programmer's Workbench, Begins p. 76.

AIM Outperforms Neural Networks and Regression! Copyright 1993, by AbTech Corporation, 508 Dale Ave., Charlottesville, VA 22903.

Polynomial Functions Can be Realized by Finite Size Multilayer Feedforward Neural Networks, Naohiro TODA, Ken–ichi Funahashi and Shiro USUI, Dept. of Information and Computer Sciences, Toyohashi University of Technology, Tempaku, Toyoshashi 441, Japan, 1991 IEEE Int'l Joint Conf. on Neural Networks, vol. 1 of 3, Singapore 18–21, Nov. 1991.

(List continued on next page.)

*Primary Examiner*—Tariq R. Hafiz
*Attorney, Agent, or Firm*—James E. Gauger

[57] ABSTRACT

A computer-based method and system selects a plurality of training vectors for a pattern recognition system by creating a plurality of clusters and then uniformly sampling the clusters. Each of the clusters is associated with a particular class and includes a plurality of example signals. The example signals are assigned to the clusters as a function of cluster-example distances. If a cluster includes one or more overlapping example signals, the number of clusters associated with the overlapping cluster is increased and the example signals are re-assigned to the clusters.

32 Claims, 3 Drawing Sheets

OTHER PUBLICATIONS

An Artificial Neural Networks For Approximating Polynomial Functions, Behnam Malakooti and YingQing Zhou, Dept. of Systems Engineering, Center for Automation and Intelligent Systems Research, Case Western Reserve University, Cleveland, Ohio, Copyright 1992 IEEE, Int'l Joint Conf. on Neural Networks, Jun. 1992, pp. III–966–III–971.

Polynomial and Standard Higher Order Neural Network, Chir–Ho Chang, Jin–Ling Lin, and J.Y. Cheung, Electrical Engineering and Computer Science, University of Oklahoma, 1993 IEEE Intl Conf. on Neural Networks, Mar. 28–Apr. 1, 1993, pp. 989–994.

A Neural Feed–Forward Network with a Polynomial Nonlinearity, Nils Hoffmann, Electronics Institute, Building 349, Technical University of Denmark, Neural Networks signal processing proceedings of the IEEE—SP Workshop, Aug. 31–Sep. 2, 199, pp. 49–58.

Robot Kinematics Learning Computations Using Polynomial Neural Networks, C.L. Philip Chen and A.D. McAulay, Dept. of Computer Science and Enginerring, Wright State University, Dayton, OH, Copyright 1991 IEEE, Proceedings of the 1991 IEEE Intl Conf. on Robotics and Automation, Sacramento, CA Apr. 1991, pp. 2638–2643.

Highly–automated, non–parametric statistical learning for autonomous target recognition, Keith C. Drake, AbTech Corporation, 700 Harris Street, Charlottesville, Virginia, Proceedings of the SPIE 20th Applied Imagery Pattern Recognition Workshop—Oct. 1991, McLean,m Virginia, pp. 1–10.

Generalization and Learning in Volterra and Radial Basis Function Networks: A Theoretical Analysis, Sean B. Holden and Peter J.W. Rayner, Cambridge University Engineering Depart., Trumpington Street, Cambridge CB2 IPZ, UK, Copyright 1992 IEEE, pp. II–273–II–276.

On The Design Principles of the Functional Link Nets, Jun Wang and Edilberto P. Teixeira, Dept. of Systems Engineering, Case Western Reserve University, IEEE Intl Conf. on Systems Engineering, Aug. 9–11, 1990, Vista International Hotel Pittsburgh, PA, IEEE Catalog No. 90CH2872–0, pp. 613–616.

Training Product Unit Neural Networks with Genetic Algorithms, David J. Janson and James F. Frenzel, University of Idaho, Genetic Algorithms, Copyright 1993 IEEE, pp. 26–33.

Speech Recognition by Computer, Stephen E. Levinson and Mark Y. Leberman, Scientific American, Apr. 1981, vol. 244 No. 4, pp. 64–76.

On the Use of Bandpass Liftering in Speech Recognition, Biing–Hwang Juang, Member, IEEE, Lawrence R. Rabiner, Fellow, IEEE, and Jay G. Wilpon, Member, IEEE, Transactions on Acoustics, Speech and Signal Processing, IEEE, vol. ASSP 35, No. 7, Jul. 1987, pp. 947–953.

Recursive Reduction in Finite Ring Computations, D. Zhang, G.A. Jullien, W.C. Miller, VLSI Research Group, Dept. of Electrical Engineering, University of Windsor, Windsor, Ontario Canada, Twenty–Third Asilomar Conference on Signals, Systems and Computers, Conference Record Vol. 2of 2, Oct. 30–Nov. 1, 1989, Pacific Grove, CA, pp. 854–856.

METHOD AND SYSTEM FOR SELECTING PATTERN RECOGNITION TRAINING VECTORS

RELATED INVENTIONS

The present invention is related to the following inventions which are assigned to the same assignee as the present invention:

(1) "Method of Training Neural Networks Used For Speech Recognition", having Ser. No. 08/253,893, filed on May 31, 1994.

The subject matter of the above-identified related inventions is hereby incorporated by reference into the disclosure of this invention.

TECHNICAL FIELD

The present invention relates generally to pattern recognition systems and, in particular, to a method and system for deriving a set of training vectors usable with a pattern recognition system.

BACKGROUND OF THE INVENTION

Pattern recognition systems are useful in a wide variety of technological areas such as image classification, target recognition and track, sonar, radar surveillance, medical diagnosis, speech and handwriting recognition. In a broad sense, a pattern recognition system is a device used to classify measurements (also know as features) that represent a set of patterns. The structure of a recognition system typically includes a sensor for gathering pattern data, a feature extraction mechanism, and a classification algorithm. For general background information on pattern recognition systems, see "Pattern Recognition Statistical, Structural, and Neural Approaches", R. Schalkoff, Wiley & Sons, 1992.

With regard to the components of a conventional recognition system, the feature extraction mechanism applies an extraction algorithm to the pattern data to produce a set of features. Generally, features are any extractable measurement used by the system. Features can be symbolic, numerical, or both. An example of a symbolic feature is color; examples of numerical features are duration and velocity.

From a geometric viewpoint, features can be arranged into an n-dimensional feature vector X, where $x_1, x_2, \ldots x_n$ are elements of X, each representing a different feature. This arrangement results in a multidimensional feature space. When n>2, this space is commonly referred to as a hyperspace. If each feature is an unconstrained real number, the feature space is represented by $R^n$. Typically, however, the feature space is restricted to a subspace of $R^n$.

Feature extraction results in a representation of the pattern data that characterizes the relevant attributes thereof. It can be regarded as a data reduction procedure that retains vital characteristics of the pattern data while eliminating the undesirable interference from irrelevant characteristics. In turn, this eases the decision-making process of the classification algorithm.

Classification assigns pattern data into one or more pre-specified classes based on the extracted features. A class is a set of patterns having certain traits or attributes in common. For example, handwriting samples of the letter E could belong to the same class. The task of a classification algorithm is to partition the feature space associated with the recognition system into separate regions for each class. The border of each class region is known as a decision boundary. When n>3, the boundary is a hyperplane. A discriminant function is a mathematical equation that is used to define boundaries between class regions. Conventional discriminant functions include linear, quadratic, and Gaussian-based discriminant functions. The accurate determination of class regions has always been a challenge in the field of pattern recognition.

A fundamental problem to be solved by the classification algorithm is to accurately discern boundaries for class regions. Typically, a classification algorithm or classifier (a device that implements the algorithm) establishes these boundaries based on known information, i.e., training sets.

Pattern recognition systems have two modes of operations: a training mode and a recognition mode. During the training mode, "knowledge" of pattern classes is brought into the classification algorithm. Training uses representative examples of the types of pattern to be encountered in the actual application of the system. The term supervised learning refers to a training mode in which the examples include respective class-labels. Basically, if enough example patterns within the classes to be recognized are provided, the training mode should be able to adequately characterized the properties of the classes so that unknown patterns can be reliably and repeatably classified across all such classes during the recognition mode.

However, prior art training techniques do not produce reliable classifiers for many types of patterns. Furthermore, these techniques are generally repetitive and require lengthy training sessions. For instance, recognition systems using neural networks as classifiers typically employ training techniques based on back propagation. Back propagation techniques require lengthy, repetitive training sessions that often yield unreliable classifiers.

Thus, there exists a need for a training technique that increases the accuracy and reliability of classifiers in a pattern recognition system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It is an advantage of the present invention to provide a method and system for selecting training vectors that enhances the fidelity of a training set and consequently improves the reliability of an associated pattern recognition system. It is also an advantage of the present invention to provide a method and system that improves the accuracy of a recognition system's classifiers without repetitive training. It is a further advantage of the present invention to provide a method of selecting training vectors that is easily implemented as software executing on a general purpose computer.

Figure 1:
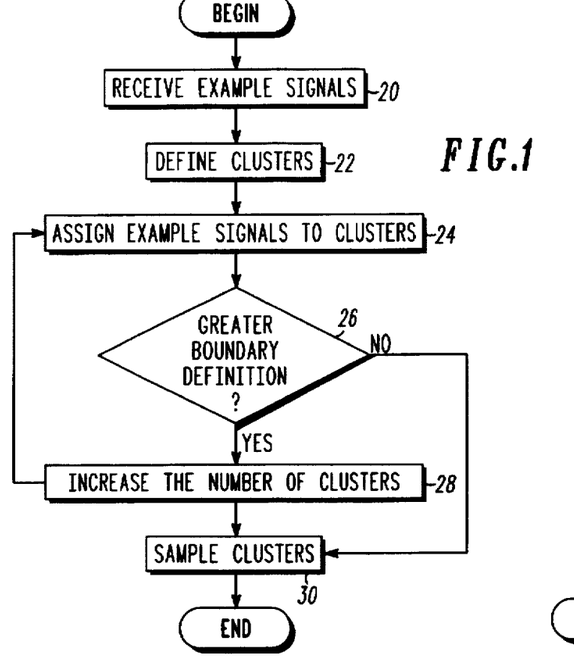
FIG. 1 shows a flow diagram representing a method of selecting training vectors in accordance with a first embodiment of the present invention.

FIG. 1 shows a flow diagram representing a method of selecting training vectors in accordance with one embodiment of the present invention. A digital computer can be programmed to implement the method. The training vectors, as well as all other signals mentioned herein, can be any form of electrical or optical signal.

In box 20, a plurality of example signals is received. These signals are preferably digital words representing feature vectors from different classes within an example space. Additionally, each example signal includes a class label. The example space is a feature space associated with the pattern recognition system for which the training vectors are being selected.

In box 22, a plurality of clusters is defined. Each cluster includes a class label and an identifier that indicates the location of the cluster within the example space. Preferably, the location identifier represents the cluster centroid. Clusters are defined such that each cluster corresponds to patterns from the same class that are highly similar under a specific pattern dissimilarity measure. The measure can be based on spectral or Euclidean distances between example signals. Using distance, the clusters can be established by limiting each of the clusters to an intra-cluster distance that is less than a prespecified distance threshold.

In box 24, the example signals are assigned to the clusters as a function of cluster-example distances. Preferably, each example signal is assigned to a closest cluster centroid by performing a nearest-neighbor search between the cluster centroids and the example signals. This results in a plurality of clusters that are populated with example signals. Some of these clusters may include example signals from different classes. An example signal having a class label that differs from that of its assigned cluster is referred to as an overlapping example signal.

Next, in decision box 26, a check is made to determine whether at least one of the class decision boundaries needs greater definition. If greater definition is needed, the number of clusters is increased (box 28) by defining new clusters. The procedure then returns to the step shown in box 24 to re-assigns the example signals to the augmented set of clusters. On the other hand, if greater definition is unnecessary, the method continues to box 30.

In box 30, the example signals from each of the clusters are sampled to select the training vectors. Although the sampling can select different quantities of signals from the clusters, it is preferable to perform a uniform sampling of the clusters. By taking an equal number of example signals from each cluster, a set of training vectors is formed that is biased to include more examples in areas where the decision boundaries between classes need greater definition. This significantly improves the reliability of pattern classifiers because their training will emphasize distinguishing between classes that are otherwise easily confused.

Referring to the step shown in box 22, the plurality of example signals within each of the classes can be clustered using a K-means clustering algorithm to produce a plurality of cluster centroids. Alternatively, the example signals can be clustered using a binary-split algorithm. These algorithms are described in "Fundamentals of Speech Recognition", L. Rabiner, B. H. Juang, Prentice-Hall, 1993, p. 125-128, the subject matter of which is hereby incorporated by this reference.

Referring to box 26, there are several techniques for determining whether to increase the number of clusters. Using a preferred technique, the method checks whether one of the clusters includes a quantity of overlapping example signals that exceeds an overlap threshold. The threshold is an integer greater than zero. If the threshold is exceeded, the number of clusters is increased (box 28) and the procedure returns to box 24. Otherwise, the method continues to box 30. With a second technique, the determination is made based on the number of overlapping signals and cluster sizes. Cluster size is the number of example signals in a populated cluster. If the size of a cluster and the quantity of overlapping signals it contains are above acceptable minimum values, the method continues to box 30. Otherwise, the example signals of the cluster are excluded from further iterations of the steps to increase the number of clusters and re-assign examples (boxes 24-28).

With a third technique, the determination is based on a ratio of the intra-cluster and inter-cluster distances. Typically, the inter-cluster distance is the distance between cluster centroids. The method iterates the steps of boxes 24-28 until the ratio drops to an acceptable level or a maximum number of iterations has been performed.

Referring to box 28, it is preferable to increase the number of clusters within the classes that include overlapping examples. This can be accomplished by arbitrarily clustering the overlapping example signals into one or more additional clusters and then using a technique, such as the K-means or binary split algorithm, to determine the cluster location identifiers. By basing the additional clusters on overlapping examples, the method will produce a set of training vectors having enhanced emphasis on decision boundaries that need greater.

The method of FIG. 1 optionally includes a step (not shown) of determining whether the classes represented by the example signals are reasonably separable. For example, if two classes are overlapped to a large extent, i.e., they are not reasonably separable, the method can optionally attempt to increase the separability of the classes before proceeding with steps 22-30. The separability of the classes can be increase by altering or increasing the dimensionality of the feature space.

Figure 2:
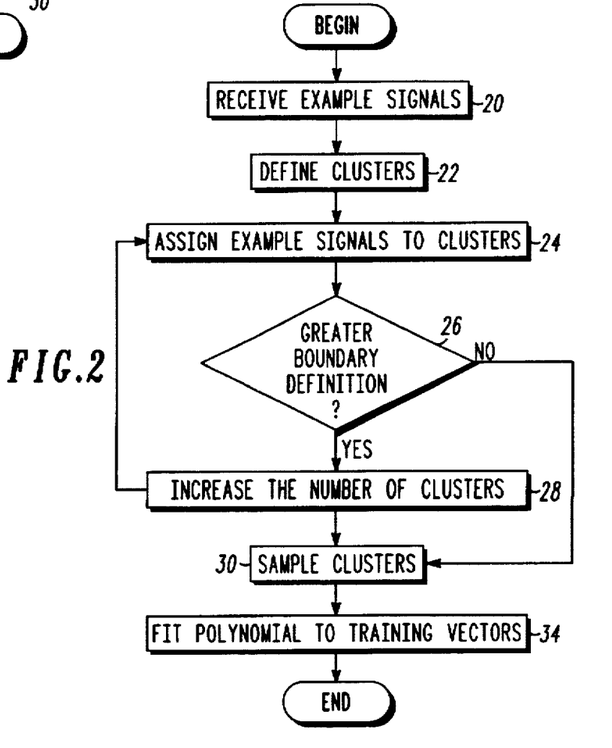
FIG. 2 shows a flow diagram representing a method of generating a polynomial discriminant function in accordance with a second embodiment of the present invention.

FIG. 2 shows a flow diagram representing a method of generating a polynomial discriminant function in accordance with a second embodiment of the present invention. A polynomial discriminant function is preferable because it can be "trained" to model decision boundaries without lengthy, repetitive training sessions. The discriminant function is then incorporated in a recognition system classifier.

The steps shown in boxes 20-30 correspond directly to those described in conjunction with FIG. 1.

In box 34, a polynomial discriminant function is fitted to the training vectors. Although many different techniques can be used to fit the discriminant function to the vectors, a least squares estimation technique is preferably used to compute polynomial coefficients. In essence, the calculation of coefficients is how the discriminant function is trained.

The polynomial discriminant function is fitted to the set of training vectors representing examples from an n-dimensional feature space. If the number of terms in the polynomial is equal to the number of examples, a matrix-inversion technique may be employed to solve for the value of each coefficient. If the number of terms is not equal to the number of examples, a least-squares estimation technique is employed to solve for the value of each coefficient. Suitable least-squares estimation techniques include, for example, least-squares, extended least-squares, pseudo-inverse algorithm, Kalman filter, maximum-likelihood algorithm, Bayesian estimation, and the like.

The discriminant function is based on a polynomial expansion represented by:

$$y = \sum_{i=0}^{m} w_i \left[ \sum_{j=0}^{n} x_j^{g_{ji}} \right] \quad (1)$$

In Equation 1, $x_j$ represents the features; y represents the discriminant function output signal; $w_i$ represents a coefficient; $g_{ji}$ represents an exponent; and i, j, m and n are integers.

Preferably, the discriminant function is a second order polynomial expansion of the form:

$$y = a_0 + \sum_{i=0}^{n} b_i x_i + \sum_{i=0}^{n} \sum_{j=0}^{n} c_{ij} x_i x_j \quad (2)$$

In Equation 2, $a_0$ represents a zero-order coefficient, $b_i$ represents a first-order coefficient, and $c_{ij}$ represents a second-order coefficient, $x_i$ and $x_j$ represent elements of an n-dimensional feature vector, y represents the discriminant function output signal, and i, j, m and n are integers.

In various other embodiments of the present invention, the discriminant function can be based on an orthogonal function, such as a sine, cosine, exponential/logarithmic, Fourier transformation, Legendre polynomial, non-linear basis function such as a Volterra function or a radial basis function, or the like, or a combination of polynomial expansions and orthogonal functions.

Figure 3:
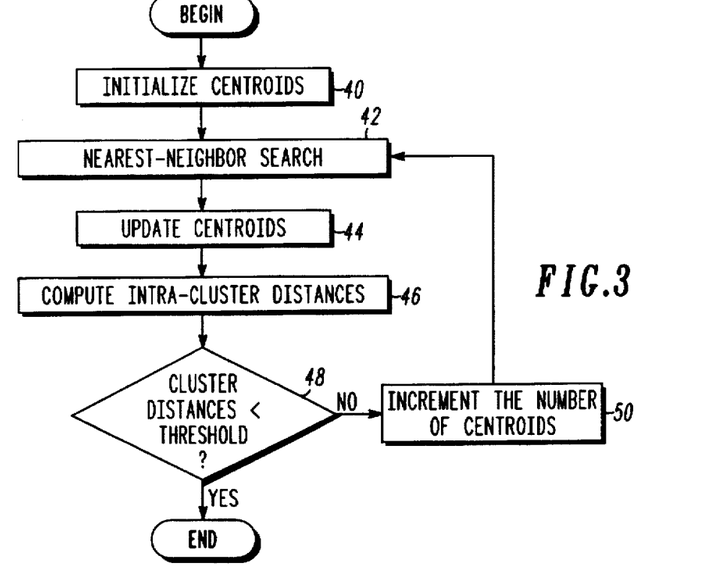
FIG. 3 shows a flow diagram representing a method of clustering example signals that can be used in the methods of FIGS. 1–2.

FIG. 3 shows a flow diagram representing a method of clustering example signals that can be used in the methods of FIGS. 1–2. This method generates centroids that can be used to identify the locations of clusters in the example space. The method of FIG. 3 is based on the K-means clustering algorithm, also referred to as the generalized Lloyd algorithm. However, in contrast to the K-means algorithm, the method of FIG. 3 iteratively increments the number of cluster centroid until the intra-cluster distances fall below a predefined threshold.

In box 40, the cluster centroids are initialized by arbitrarily choosing a set of example signals to be the centroids.

Next, in box 42 a nearest-neighbor search is performed to assign each of the example signals to a closest cluster. The search is performed for each signal by comparing the various distances between each cluster centroid and the signal.

In box 44, the cluster centroids are updated. This is accomplished by calculating a new centroid based on the example signals assigned to the cluster in box 42.

In box 46, the intra-cluster distance is computed for each cluster. The intra-cluster distance is preferably the average distance between centroid and the assigned example signals.

In decision box 48, a check is made to determine whether the cluster distances are less than a predefined threshold. Either the average of the intra-cluster distances, the maximum intra-cluster distance, or the inter-cluster distance can be used in this comparison. The inter-cluster distance can be based on the distance between cluster centroids. The threshold can be fixed in value or vary between iterations of the method steps. If the threshold is not exceeded, the method terminates and the current centroids are used to define the locations of the clusters. Otherwise, the method proceeds to box 50.

In box 50, the number of cluster centroids is increased by selecting one or more example signals to represent additional centroids. The method returns to box 42. The steps of boxes 42–50 can be repeated until the intra-cluster distances falls below the threshold or the number of iterations exceeds a predefined limit. Optionally, the method may include a step that compares the rate of convergence of the cluster distances to determine whether the method steps should be repeated.

Figure 4:
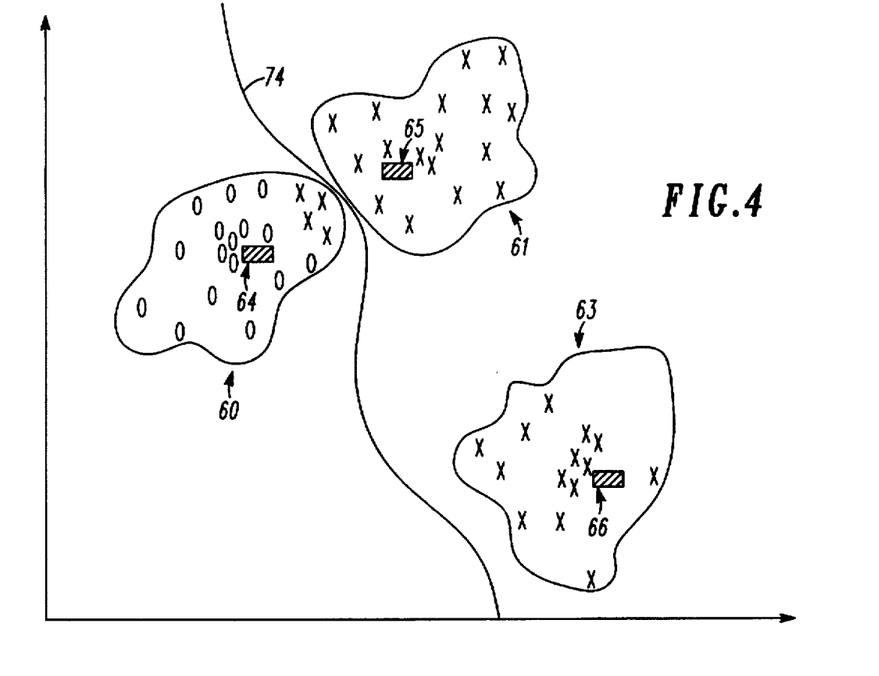
FIG. 4 is a graphical representation of an example space having an overlapping cluster.

FIG. 4 is a graphical representation of an exemplary example space that includes overlapping signals. A two dimensional example space is depicted for conceptual simplicity. Two pattern classes are shown: an x-class and o-class. Members of the classes are identified in the example space by their respective symbols.

The example space of FIG. 4 can be thought of as representing a feature space after a first iteration of the method steps of boxes 20–24. Three clusters 60–63 and their respective centroids 64–66 have been defined. A first decision boundary 74 is arbitrarily chosen to separate the clusters according to class. The first cluster 60 represents a sub-region of the o-class feature space, while the second and third clusters 61–63 represent sub-regions in the x-class feature space. The first cluster 60 includes overlapping example signals, that is, examples of x-class patterns. Thus, if a classifier implements the first decision boundary 67, it is likely to misclassify x-patterns as o-patterns.

Figure 5:
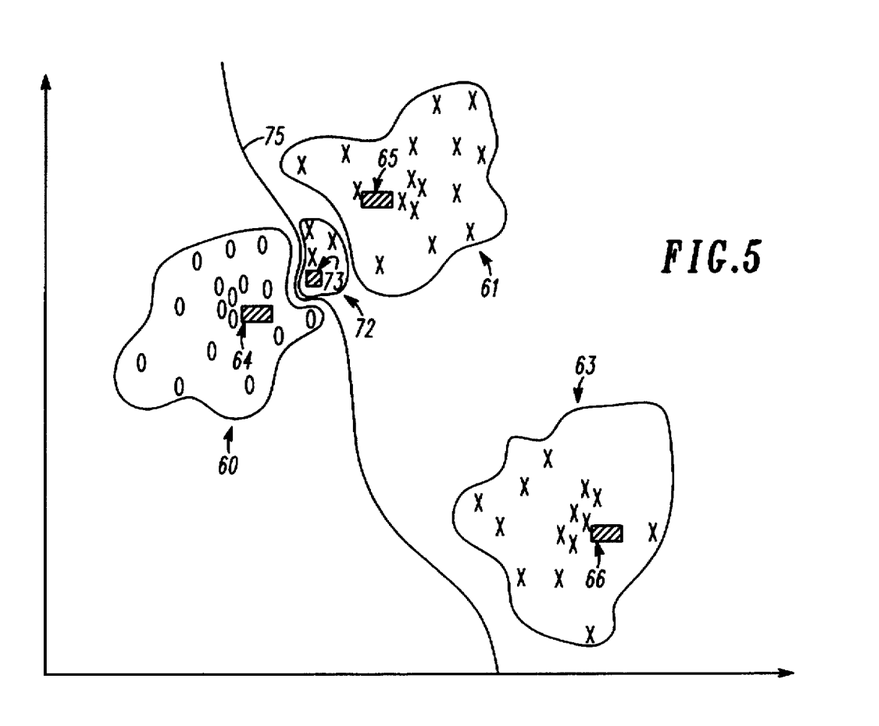
FIG. 5 illustrates an exemplary result of applying an embodiment of the present invention to the example space of FIG. 4.

FIG. 5 illustrates an exemplary result of iteratively applying the steps of boxes 24–28 to the example space of FIG. 4. An additional cluster 72 and its centroid 73 are defined. In this example, the additional cluster 72 includes the overlapping example signals. A refined decision boundary 75 can then be chosen to separate the clusters according to class. In this case, the decision boundary 75 reliably separates the classes, which reduces the likelihood of pattern misclassification.

Figure 6:
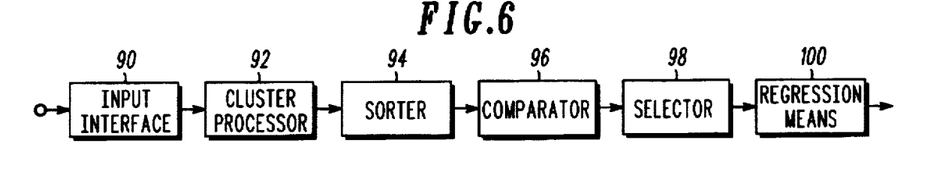
FIG. 6 shows a block diagram of a system for selecting training vectors in accordance with a third embodiment of the present invention.

FIG. 6 shows a block diagram of a system for selecting training vectors in accordance with a third embodiment of the present invention. The computer-implementable system includes an input interface 90, a cluster processor 92, a sorter 94, a comparator 96, a selector 98, and a regression means 100. The system can be implemented as a special purpose logic circuit or a combination of special purpose circuits and a microprocessor executing a computer program.

The input interface 90 receives the example signals described in conjunction with box 20. The input interface 90 can include a bus interface circuit or software routines for transferring data into the system.

The cluster processor 92 defines the plurality of clusters described for FIG. 1 based on the example signal it receives from the input interface 90.

The sorter 94 assigns the example signals to the clusters as a function of a plurality of cluster-example distances. The sorter 94 re-assigns the example signals to clusters in response to the comparator increasing the number of clusters.

The comparator 96 determines whether one of the clusters includes overlapping example signals exceeds an overlap threshold. If the threshold is exceeded, the comparator increases the number clusters associated with the overlapping example signals.

The selector 98 selects the training vectors by a uniform sampling of example signals from each clusters.

The regression means 100 fits a polynomial expansion to the training vectors using a least squares estimate.

Figure 7:
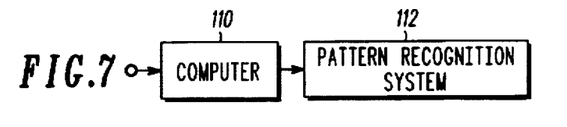
FIG. 7 illustrates a system that can incorporate an embodiment of the present invention.

FIG. 7 illustrates a system that can incorporate an embodiment of the present invention, such as any of those shown in FIGS. 1, 2, and 6. The system includes a computer 110 and a pattern recognition system 112. Either of the methods shown in FIGS. 1–2 could be implemented as steps in a computer program that is executable by the computer 110. Upon executing such a computer program, the computer 110 would pass results produced by the respective method (either selected training vectors or polynomial coefficients) to the pattern recognition system 112. Preferably, the pattern recognition system 112 is detachably connected to the computer 110.

In the event that the computer 110 produces training vectors, the pattern recognition system 112 would enter a training mode upon receiving these vectors. After completion of training with the vectors, the pattern recognition system could enter a recognition mode.

By producing discriminant function coefficients, the computer 110 would allow the pattern recognition system 112 to directly enter the recognition mode without first executing the training mode. This could simplify the pattern recognition system 112.

Figure 8:
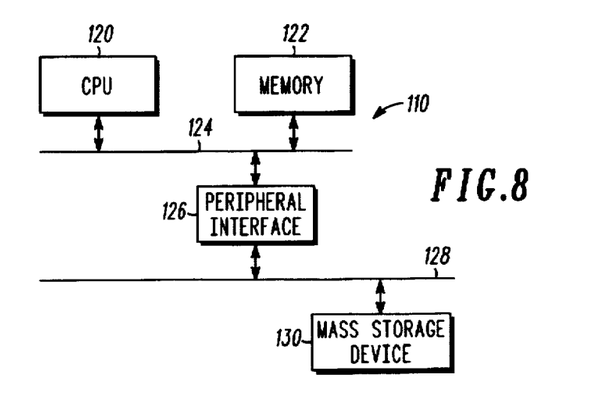
FIG. 8 is a detailed block diagram of the computer shown in FIG. 7.

FIG. 8 is a detailed block diagram of the computer 110 shown in FIG. 7. The computer 110 is a general purpose computer that includes a central processing unit (CPU) 120, a memory 122, a processor bus 124, a peripheral interface 126, a peripheral bus 128, and a mass storage device 130.

The CPU 120 executes programs that are stored in either the memory 122 or the mass storage device 130. Data is transferred between the CPU 120, memory 122, and peripheral interface 126 by way of processor bus 124. The peripheral interface 126 includes circuitry for transferring data between the devices connected to the processor bus 124 and devices connected to the peripheral bus 128. Generally, the processor bus 124 operates at higher speeds than the peripheral bus 128. The mass storage device 130 can be any device for storing computer-readable data, such as a disk drive, tape drive, or memory circuit.

A computer program that includes the method steps of FIGS. 1–2 can be stored in either the memory 122 or the mass storage device 130. Such a program can be executed by the CPU 120.

The system shown in FIG. 6 can be implemented in the computer 110 as any number of different combinations of software and hardware components. For example, elements 90–100 of the system could be implemented in an application specific integrated circuit (ASIC) or a special purpose circuit board having discrete logic circuits. Such an ASIC or circuit board could be attached to either the processor bus 124 or the peripheral bus 128.

Preferably, the pattern recognition system 112 is connected to the peripheral bus 128. However, the recognition system 112 can be optionally connected to the processor bus 124.

In another embodiment of the present invention, the method steps of FIG. 1 or FIG. 2 and the pattern recognition system 112 are implemented as routines in a computer program that is storable in memory 122 or mass storage device 130 and executable by CPU 120.

In a further embodiment of the present invention, the method and system of selecting training vectors or generating discriminant coefficients is implemented as an article of manufacture. The article of manufacture includes a computer-readable memory usable for causing a computer to select training vectors for a pattern recognition system. The article of manufacture is produced by the act of storing a computer program in the computer-readable memory, where the computer program includes either of the methods described in conjunction with FIGS. 1–2. The computer-readable memory could be any means for storing a computer program, including the memory circuit 122, the mass storage device 130, or a CD-ROM, hard disk drive, floppy disk, ROM, or RAM.

In summary, there has been described herein a concept, as well as a preferred embodiment, of a method and system which may be used to select train vectors or produce discriminant function coefficients. Because the embodiments of the method and system as herein-described utilize clustering techniques to bias training vector sets they can improve the reliability of classifiers in a pattern recognition system. Furthermore, one embodiment of the method and system of the present invention provides a technique for producing polynomial discriminant functions. Such discriminant functions can be produced using a least squares estimation method that does not require repetitive training sessions.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a computer, a method of selecting a plurality of training vectors for a pattern recognition system, the method comprising the following steps:

receiving a plurality of example signals representing a plurality of classes within an example space, each of the plurality of example signals being associated with a respective class;

defining a plurality of clusters, each of the plurality of clusters being associated with one of the plurality of classes;

assigning the plurality of example signals to the plurality of clusters as a function of a plurality of cluster-example distances;

determining whether at least one decision boundary needs greater definition, if so, increasing in number the plurality of clusters and repeating the step of assigning;

selecting the plurality of training vectors by sampling of the plurality of example signals from each of the plurality of clusters; and fitting a polynomial expansion to the plurality of training vectors using a least squares estimate, wherein the polynomial expansion has a form $$y = a_0 + \sum_{i=0}^{n} b_i x_i + \sum_{i=0}^{n} \sum_{j=0}^{n} c_{ij} x_i x_j;$$

wherein x represents at least one element of a training vector, i, j, and n are integers, y represents a discriminant signal, $a_0$ represents a zero-order coefficient, $b_i$ represents a first-order coefficient, and $c_{ij}$ represents a second-order coefficient.

2. The method of claim 1, wherein the step of selecting includes:

performing a uniform sampling of the plurality of example signals from each of the plurality of clusters.

3. The method of claim 1, wherein the step of determining includes:

determining whether the at least one decision boundary needs greater definition based on a ratio of intra-cluster and inter-cluster distances.

4. The method of claim 1, wherein the step of determining includes:

determining whether the at least one decision boundary needs greater definition based on at least one cluster size.

5. The method of claim 1, wherein the step of determining includes:

determining whether at least one of the clusters includes a quantity of overlapping example signals that exceeds an overlap threshold, if so, increasing in number the plurality of clusters and repeating the step of assigning.

6. The method of claim 5, wherein the steps of assigning and determining are repeated until the quantity of overlapping example signals does not exceed the overlap threshold.

7. The method of claim 1, wherein the step of defining includes the following sub-step:

clustering the plurality of example signals within each of the plurality of classes using a K-means clustering algorithm.

8. The method of claim 7, wherein the step of defining includes the following sub-step:

clustering the plurality of example signals within each of the plurality of classes using a binary-split algorithm.

9. The method of claim 1, wherein the step of defining includes the following sub-step:

limiting each of the plurality of clusters to having an intra-cluster distance which is less than a distance threshold.

10. The method of claim 1, wherein the step of assigning includes the following sub-step:

assigning each of the plurality of example signals to a closest one of the plurality of clusters by performing a nearest-neighbor search between the plurality of clusters and the plurality of example signals.

11. In a computer, a method of selecting a plurality of training vectors for a pattern recognition system, the method comprising the following steps:

receiving a plurality of example signals representing a plurality of classes within an example space, each of the plurality of example signals being associated with a respective class;

generating a plurality of cluster centroids by applying a K-means clustering algorithm to the example signals, each of the cluster centroids corresponding to one of the classes;

assigning each of the plurality of example signals to a closest one of the plurality of cluster centroids by performing a nearest-neighbor search between the plurality of cluster centroids and the plurality of example signals, whereby producing a plurality of clusters;

determining whether at least one of the clusters includes a quantity of overlapping example signals that exceeds an overlap threshold, if so, increasing in number the plurality of cluster centroids and repeating the step of assigning;

selecting the plurality of training vectors by a uniform sampling of the plurality of example signals from each of the plurality of clusters; and fitting a polynomial expansion to the plurality of training vectors using a least squares estimate wherein the polynomial expansion has a form $$y = a_0 + \sum_{i=0}^{n} b_i x_i + \sum_{i=0}^{n} \sum_{j=0}^{n} c_{ij} x_i x_j;$$

wherein x represents at least one element of a training vector, i, j, and n are integers, y represents a discriminant signal, $a_0$ represents a zero-order coefficient, $b_i$ represents a first-order coefficient, and $c_{ij}$ represents a second-order coefficient.

12. The method of claim 11, wherein the steps of assigning and determining are repeated until the quantity of overlapping example signals does not exceed the overlap threshold.

13. The method of claim 11, wherein the step of generating includes the following sub-step:

applying a binary-split algorithm to the plurality of example signals.

14. The method of claim 11, wherein the step of determining includes the following sub-step:

defining at least one additional cluster centroid based on a plurality of overlapping example signals.

15. The method of claim 11, wherein the step of determining includes the following sub-step:

using a K-means algorithm to increase in number the plurality of cluster centroids.

16. A computer system for selecting a plurality of training vectors for a pattern recognition system, which comprises:

an input interface for receiving a plurality of example signals representing a plurality of classes within an example space, each of the plurality of example signals being associated with a respective class;

a cluster processor, operatively associated with the input interface, for defining a plurality of clusters, each of the plurality of clusters being associated with one of the plurality of classes;

a sorter, operatively associated with the cluster processor, for assigning the plurality of example signals to the plurality of clusters as a function of a plurality of cluster-example distances;

a comparator, operatively associated with the sorter, for determining whether at least one of the clusters includes a quantity of overlapping example signals that exceeds an overlap threshold, if so, the comparator increasing in number the plurality of clusters associated with the overlapping example signals;

a selector, operatively associated with the comparator, for selecting the plurality of training vectors by a uniform sampling of the plurality of example signals from each of the plurality of clusters;

wherein the sorter re-assigns the plurality of example signals to the plurality of clusters in response to the comparator increasing in number the plurality of clusters; and regression means for fitting a polynomial expansion to the plurality of training vectors using a least squares estimate, wherein the polynomial expansion has a form $$y = a_0 + \sum_{i=0}^{n} b_i x_i + \sum_{i=0}^{n} \sum_{j=0}^{n} c_{ij} x_i x_j;$$

wherein x represents at least one element of a training vector, i, j, and n are integers, y represents a discriminant signal, $a_0$ represents a zero-order coefficient, $b_i$ represents a first-order coefficient, and $c_{ij}$ represents a second-order coefficient.

17. The computer system of claim 16, wherein the sorter and the selector cooperatively function until the quantity of overlapping example signals is less than the overlap threshold.

18. The computer system of claim 16, wherein the cluster processor uses a K-means clustering algorithm to cluster the plurality of example signals within each of the plurality of classes.

19. The computer system of claim 18, wherein the cluster processor uses a binary-split algorithm to cluster the plurality of example signals within each of the plurality of classes.

20. The computer system of claim 16, wherein the cluster processor limits each of the plurality of clusters to having an intra-cluster distance which is less than a distance threshold.

21. The computer system of claim 16, wherein the sorter assigns each of the plurality of example signals to a closest one of the plurality of clusters by performing a nearest-neighbor search between the plurality of clusters and the plurality of example signals.

22. An article of manufacture, which comprises:
a computer-readable memory usable for causing a computer to select a plurality of training vectors for a pattern recognition system, the computer-readable memory having a structure defined by storing a computer program in the computer-readable memory;
wherein the computer program includes a method for selecting the plurality of training vectors, the method comprising the following steps:
receiving a plurality of example signals representing a plurality of classes within an example space, each of the plurality of example signals being associated with a respective class;
defining a plurality of clusters, each of the plurality of clusters being associated with one of the plurality of classes;
assigning the plurality of example signals to the plurality of clusters as a function of a plurality of cluster-example distances;
determining whether at least one of the clusters includes a quantity of overlapping example signals that exceeds an overlap threshold, if so, increasing in number the plurality of clusters and repeating the step of assigning;
selecting the plurality of training vectors by a uniform sampling of the plurality of example signals from each of the plurality of clusters; and
fitting a polynomial expansion to the plurality of training vectors using a least squares estimate.

23. The article of manufacture of claim 22, wherein the method steps of assigning and determining are repeated until the quantity of overlapping example signals does not exceed the overlap threshold.

24. The article of manufacture of claim 22, wherein the method step of defining includes the following sub-step:
clustering the plurality of example signals within each of the plurality of classes using a K-means clustering algorithm.

25. The article of manufacture of claim 24, wherein the method step of defining includes the following sub-step:
clustering the plurality of example signals within each of the plurality of classes using a binary-split algorithm.

26. The article of manufacture of claim 22, wherein the method step of defining includes the following sub-step:
limiting each of the plurality of clusters to having an intra-cluster distance which is less than a distance threshold.

27. The article of manufacture of claim 22, wherein the method step of assigning includes the following sub-step:
assigning each of the plurality of example signals to a closest one of the plurality of clusters by performing a nearest-neighbor search between the plurality of clusters and the plurality of example signals.

28. The article of manufacture of claim 22, wherein the polynomial expansion has a form $$y = a_0 + \sum_{i=0}^{n} b_i x_i + \sum_{i=0}^{n} \sum_{j=0}^{n} c_{ij} x_i x_j;$$

wherein x represents at least one element of a training vector, i, j, and n are integers, y represents a discriminant signal, $a_0$ represents a zero-order coefficient, $b_i$ represents a first-order coefficient, and $c_{ij}$ represents a second-order coefficient.

29. A computer system for selecting a plurality of training vectors for a pattern recognition system, which comprises:
an input interface for receiving a plurality of example signals representing a plurality of classes within an example space, each of the plurality of example signals being associated with a respective class;
a cluster processor, operatively associated with the input interface, for defining a plurality of clusters, each of the plurality of clusters being associated with one of the plurality of classes;
a sorter, operatively associated with the cluster processor, for assigning the plurality of example signals to the plurality of clusters as a function of a plurality of cluster-example distances;
a comparator, operatively associated with the sorter, for determining whether at least one of the clusters includes a quantity of overlapping example signals that exceeds an overlap threshold;
a selector, operatively associated with the comparator, for selecting the plurality of training vectors by a uniform sampling of the plurality of example signals from each of the plurality of clusters;
wherein the sorter re-assigns the plurality of example signals to the plurality of clusters in response to the comparator increasing in number the plurality of clusters; and
a regression fitting module for fitting a polynomial expansion to the plurality of training vectors, wherein the polynomial expansion is a function of at least one element of a training vector and a plurality of coefficients, at least one of the plurality of coefficients comprising a second-order coefficient.

30. The computer system of claim 29, wherein the polynomial expansion has a form $$y = a_0 + \sum_{i=0}^{n} b_i x_i + \sum_{i=0}^{n} \sum_{j=0}^{n} c_{ij} x_i x_j;$$

wherein x represents at least one element of a training vector, i, j, and n are integers, y represents a discriminant signal, $a_0$ represents a zero-order coefficient, $b_i$ represents a first-order coefficient, and $c_{ij}$ represents a second-order coefficient.

31. The computer system of claim 29, wherein the comparator increases in number the plurality of clusters associated with the overlapping example signals.

32. The computer system of claim 31, wherein the sorter re-assigns the plurality of example signals to the plurality of clusters in response to the comparator increasing in number the plurality of clusters.

* * * * *